United States Patent [19]

Maio et al.

[11] 3,875,378

[45] Apr. 1, 1975

[54] HYBRID COMPUTING APPARATUS OF AUTOMATIC CONNECTION TYPE

[75] Inventors: Kenji Maio, Kokubunji; Shigeru Watanabe, Kodaira; Norio Yokozawa, Fuchu, all of Japan

[73] Assignee: Hitachi, Ltd., Tokyo, Japan

[22] Filed: Sept. 1, 1972

[21] Appl. No.: 285,908

[30] Foreign Application Priority Data

Sept. 2, 1971 Japan .............................. 46-67637

[52] U.S. Cl. ......................... 235/150.5, 235/150.51

[51] Int. Cl. ............................................ G06j 1/00

[58] Field of Search ....... 235/150.5, 150.51, 150.52, 235/150.53, 197, 150.4; 340/172.5

[56] References Cited

UNITED STATES PATENTS

| | | | |
|---|---|---|---|
| 3,406,379 | 10/1968 | Palevsky et al. | 235/150.5 |
| 3,443,074 | 5/1969 | Schmid | 235/150.4 |
| 3,470,362 | 9/1969 | Miller | 235/150.4 |
| 3,493,731 | 2/1970 | Lemonde | 235/150.5 |
| 3,582,628 | 6/1971 | Brussolo | 235/150.5 |
| 3,610,896 | 10/1971 | Heid | 235/150.5 |

*Primary Examiner*—Joseph F. Ruggiero
*Attorney, Agent, or Firm*—Craig & Antonelli

[57] ABSTRACT

A hybrid computer automatically connecting a plurality of computing elements, for example integrators of an analog computer by an instruction signal from a digital computer to perform a desired computation is equipped with an automatic control system for the mode control of the integrators of the analog computer. When the digital computer decodes a program written in a simulation language and supplies an instruction signal to the automatic control system, the automatic control system controls the mode of the integrators of the analog computer based on the instruction signal.

4 Claims, 4 Drawing Figures

HYBRID COMPUTING APPARATUS OF AUTOMATIC CONNECTION TYPE

BACKGROUND OF THE INVENTION

1. Field of the Invention

The present invention relates to a hybrid computer equipped with a novel circuit for performing the function of a simulation language with hardware.

2. Description of the Prior Art

In a hybrid computer of the automatic connection type one considers not only control of the connections between analog computing elements, but also the computation by an analog computing section, the setting of a potentiometer, the connection with a solution indication device, the settings of the integration time constant and the repetition cycle of computation, and the like can be performed by means of a digital computer. However, in order that such a system is easy for users to handle, a language suitable for specific problems for realizing such a system and hardwares corresponding thereto are necessary.

There are several reports on hybrid computers of the automatic connection type. However, these reported computers employ exclusive language for controlling the computers and exclusive hardwares corresponding to the languages. Therefore, these computers lack flexibility.

On the other hand, as an application program of a digital computer there are so-called simulation languages for simulating an analog computer with a digital computer. To date various simulation languages are known. These programs are versatile and easy to use in that they are applicable to almost all kinds of digital computers. However, they have the disadvantage that the computing time is generally longer compared with the solution by an analog computer. Consequently, if the simulation languages can be utilized as input languages to a hybrid computer of the automatic connection type, they are easy to handle and high speed computation is possible.

SUMMARY OF THE INVENTION

An object of the present invention is, in order to enable the above-described languages for the specific problems for a digital computer (simulation languages) to be utilized as languages for a hybrid computer of the automatic connection type, to provide a hardware system including analog computing elements, control devices and the like for the simulation languages.

DESCRIPTION OF THE PREFERRED EMBODIMENTS

Figure 1:
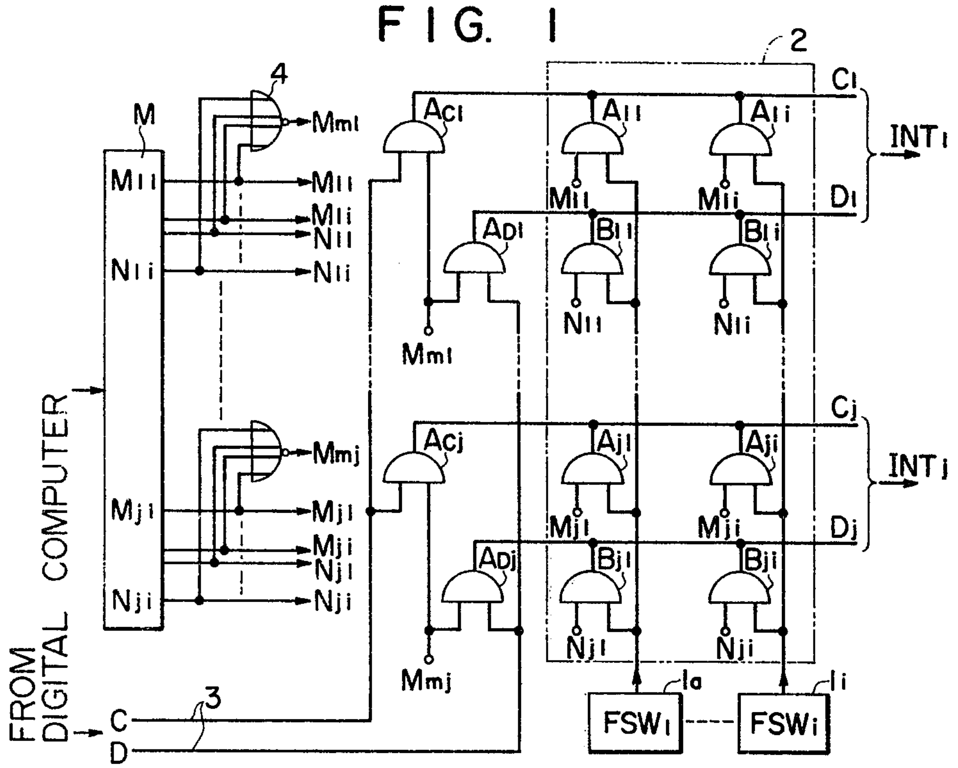
FIGS. 1 to 3 are diagrams of parts of the circuit of the automatic control system according to the present invention.

An example of the function of a simulation language is listed in the following table. The computing elements for realizing the function are also listed therein. For example, an integrator is employed for INT, and a function switch element is employed for FSW. These functions are different in their description depending on the type of simulation language, but the operation contents thereof are almost identical. The integrators, function switches, etc. employed are all known ones.

Table

| Function | Describing Form | Computation | Analog Computing Elements |
|---|---|---|---|
| Addition | A D D | $R = A + B$ | Adder |
| Subtraction | S U B | $R = A - B$ | Sign Changer + Adder |
| Multiplication | M P Y | $R = A \times B$ | Multiplier |
| Division | D I V | $R = A/B$ | Operational Amplifier + Multiplier |
| Multiplication and Addition | M A D | $R = A + B + C * D$ | Multiplier + Adder |
| Sign Change | N E G | $R = -A$ | Digital Potentiometer |
| Equality Sign | E Q R | $R = A$ | Automatic Connecting Device |
| Absolute Value | A B S | $R = \lvert A \rvert$ | Absolute Value Element |
| Square Root | S Q R (A) | $R = \sqrt{A}$ | Operational Amplifier + Multiplier |
| Sine | S I N (A) | $R = \mathrm{Sin}\ A$ | Sine Function Generator |
| Cosine | C O S (A) | $R = \mathrm{Cos}\ A$ | Cosine Function Generator |
| Tangent | A T N (A) | $R = \mathrm{Tan}\ A$ | Tangential Function Generator |
| Exponential | Exp (A, B) | $R = B^A$ | Exponential Function Generator (When B = 10) |
| Logrithm | L $\bar{O}$ G (A, B) | $R = \log_B A$ | Logrithmic Function Generator (When B = 10) |
| Function Switch | F S W (A, B, C, D) | $R = B$ (for $A > 0$)<br>C (for $A = 0$)<br>D (for $A < 0$) | Function Switch |
| Logical Switch | L S W (A, B, C) | $R = B$ (for A: true)<br>C (for A: false) | |
| A N D | A $\underline{N}$ D | $R = A \sqcap B$ | |
| Exclusive OR | E $\underline{O}$ R | $R = (A \sqcap B) \sqcap A \sqcap B)$ | |
| Inclusive OR | I $\underline{O}$ R | $R = A \sqcap B$ | |
| Complement | C $\underline{O}$ M | $R = \bar{A}$ | |
| Name of Constant | C $\bar{O}$ N | | Partial Digital Potentiometer |
| Name of Parameter | P A R | | " |
| Name of Constant Function | C F N | | " |
| Name of Parameter Function | P F N | | " |

| | | | |
|---|---|---|---|
| Print Out | $\overline{O}$ U T | | |
| Print Headers | H D R | | Pen Recorder and Typewriter |
| Plot | P L $\overline{C}$ | | X – Y Recorder |
| Others, Relative to Plot | | | |
| Sub Program (four kinds) | | | |
| Integration | I N T (A, B, C, D) | $R = B + \int A dt$ | Integrator (with Individual Mode Control) |

| C / D | 1 | 0 |
|---|---|---|
| 1 | Computation | Hold |
| 0 | Reset | Computation |

| | | | |
|---|---|---|---|
| Limited Integral | L I N (A, B, C, D) | R = 0 for B < C<br>A for C≤B≤D<br>0 for B > D | |
| Limiter | L I M (A, B, C) | R = B for A < B<br>R = A for B≤A≤C<br>R = C for A > C | Saturation Characteristic Element |
| Dead Zone | D S P (A, B, C) | R = A = B for A < B<br>R = 0 for B≤A≤C<br>R = A – C for A > C | Dead Zone Characteristic Element |
| Time Delay | T D L (A, B, C) | R = A (t – B) | |
| First Order Delay Characteristic | F T R (A, B) | R = A(S)/(BS + 1) | (S: Laplace Transform Operator |
| Function | F U N (A, B) | R = A (B) | Arbitrary Function Generator |
| Implicit Function | I M P | | Operational Amplifier |
| Max., Min. | M A X, M I N | | |
| Noise Generator | R N G | | Noise Generator (Gaussian Distribution) |
| Noise Generator | R N U | | Noise Generator (Uniform distribution) |
| Differentiation | D E R (A, B, C) | R = dB/dA (R = C at t = 0) | |
| Mono-Stable Multivibrator | M M V | | |
| Track and Store | T A S | | |
| Flip-Flop | F L F | | |
| Zero Order Hold | Z $\overline{O}$ H | | |
| Control Function | F I N (A, B) | R = True A≥B<br>R = False A≥B | Comparator |

Figure 4:
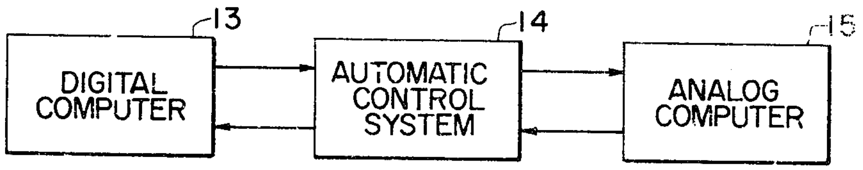
FIG. 4 is a block diagram showing the fundamental construction of the hybrid computer according to the present invention.

A program written in a simulation language is processed by a digital computer 13 and performs connection between computing elements in an analog computer 15 necessary for executing the program by an instruction signal from the digital computer 13 to start a computation as shown in FIG. 4. In this case the mode control of the analog computing elements, in particular integrators is necessary. Hitherto this control has been effected manually or by a program prepared beforehand by an operator for each problem, and hence there has been no problem in this respect. The present invention employs an automatic control system 14 for automatically performing computation only by a program written in a simulation language. As the automatic control system 14, that one which can perform all the functions listed in the above table is most desirable Now consider, as an example, $$R = INT\ (A,\ B,\ C_1,\ D_1)$$

$$C_1 = FSW\ (M_1,\ N_1,\ 0_1,\ P_1)$$

$$D_1 = FSW\ (M_2,\ N_2,\ O_2,\ P_2)$$

which are written in a simulation language, where the functions of INT and FSW are as described in the above table. In this case it is implied that the mode control of the integrator is indicated to be performed by the output from FSW.

The integrator is controlled in an operation state for example, computation state, holding state, reset state or the like. This control is called mode control. The means for the mode control is contained in the integrator. The mode control is effected by an instruction signal ($C_1$, $D_1$) from the digital computer in such a manner that if $C_1 = 1$ and $D_1 = 1$ it implies "computation" These situations are well known (see the above table).

FIG. 1 shows a circuit part of the automatic control system 14 for performing the mode control. Reference characters 1a to 1i designate function switches FSW1 to FSWi, reference numeral 2 designates a logical gate matrix arrangement for supplying an output of an arbitrary function switch FSW on the signal line $C_j$ or $D_j$ connected to an arbitrary integrator $INT_j$ in the analog computer 15, reference characters $A_{11}$ to $A_{ji}$ and $B_{11}$ to $B_{ji}$ designate AND gates arranged in an matrix form, and reference characters $M_{11}$ to $M_{ji}$ and $N_{11}$ to $N_{ji}$ designate memories connected to one input terminal of the AND gates $A_{11}$ to $A_{ji}$ and $B_{11}$ to $B_{ji}$, in which memories various instruction signals $M_{11}$ to $M_{ji}$ and $N_{11}$ to $N_{ji}$ produced by decoding a simulation language from the digital computer 13 are stored. For example, if the memory $M_{11}$ corrresponding to the intersection of the output of the function switch 1_a_ and the signal line $C_1$ and the memory $N_{12}$ corresponding to the intersection of the output of the function switch 1_b_ and the signal line $D_1$ are selectively set (selected to be "1"), the integrator corresponding thereto and the mode of the integrator are controlled depending on the condition controlling the signal lines $C_1$ and $D_1$ that is, the signs of the outputs (the mode control signal of the integrator INT 1) of the function switches 1_a_ and 1_b_.

When $C_1$, and $D_1$; . . . $C_j$, $D_j$; . . . are not clearly indicated in the simulation language, there is provided not such individual controls as controls integrators individually, but such a main control as controls a plurality of integrators simultaneously. Of course, the individually controlled integrators and the simultaneously controlled integrators may be present at a time. Hardware for performing these controls are shown in FIG. 1 additionally. Reference numeral 3 designates main control lines, to the terminals C and D of which an instruction signal from the digital computer 13 is applied. Reference numeral 4 designates NOR circuits, and reference characters $A_{C1}$ to $A_{Dj}$ designate AND circuits. For example, if any one of the instruction signals $M_{11}$ to $N_{1i}$ is 1, then $M_{m1}$ = O , and if all of the instruction signals $M_{11}$ to $N_{1i}$ are O, then $M_{m1}$ = 1. Consequently, if $C_1$, $D_1$; . . . $C_j$, $D_f$; . . . and are not clearly indicated, all of the output signals $M_{m1}$ to $M_{mj}$ from the NOR circuits 4 are 1, so that a signal appears at the terminals C and D to control the modes of all the integrators simultaneously.

As another example, when the integrator INT 1 is separately controlled, the NOR output $M_{m1}$ is "O"because at least one of the instruction signals $M_{11}$ to $N_{1i}$ is "1". On the other hand, when the integrators are not individually controlled, the NOR output $M_{m1}$ is "1", and the control of the integrator INT 1 corresponding to the NOR output $M_{m1}$ is a main control.

As a further example, logical switches LSW are considered. While the function switches FSW can take both analog and digital quantities, the control of the logical switches LSW can take only the digital quantity as shown in the afore-disclosed table. Since the function of the logical switches LSW is the same as that of the function switches FSW, the logical switches LSW can be used in a similar manner to that shown in FIG. 1.

Figure 2:
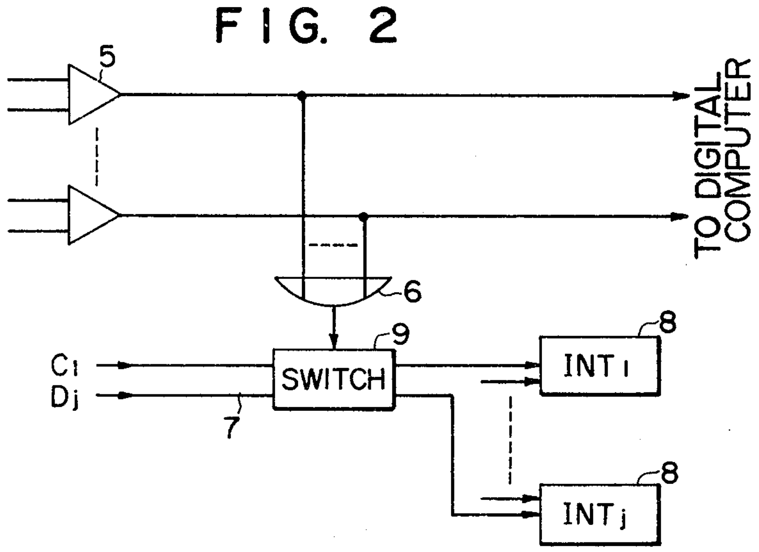

A similar example of the simulation language will next be described.

$$R = FIN\ (A, B) \tag{1}$$

where if A ≥ B, R = "1",
and if A < B, R = "O"
R = "1"implies the interruption of the computation, and R = "1"implies the continuation of the computation. In the embodiment of the present invention, all the integrators were put in a hold mode when R = "1", and at the same time their signals were input to the digital computer to indicate the completion of the computation. In this case, though the integrators were put in the hold mode, other modes which return the integrators to their initial condition (for example, reset mode or the like) will also be sufficient. The circuit part of the automatic control system 14 for performing this operation is shown in FIG. 2. As has been described before, this circuit is most frequently used when a simulation language is employed.

In FIG. 2, reference numeral 5 designates comparators for decision on the end results of the computation of, for example, the integrators. The comparators 5 are provided in the analog computer 15. Reference numeral 6 designates an OR gate, reference numeral 7 designates signal lines for mode control, reference numeral 8 designates the integrators in the analog computer 15, and reference numeral 9 designates a switch The signal lines 7 are supplied with a signal from a mode control signal generator (now shown). In this circuit, when any one of the comparators 5 satisfies the condition of Equation (1) and produces an output "1", the switch 9 is actuated by the output of the OR gate 6 to immediately supply a mode control signal, for example, a hold signal to all the integrators 8 to put their computation mode in a hold mode.

Figure 3:
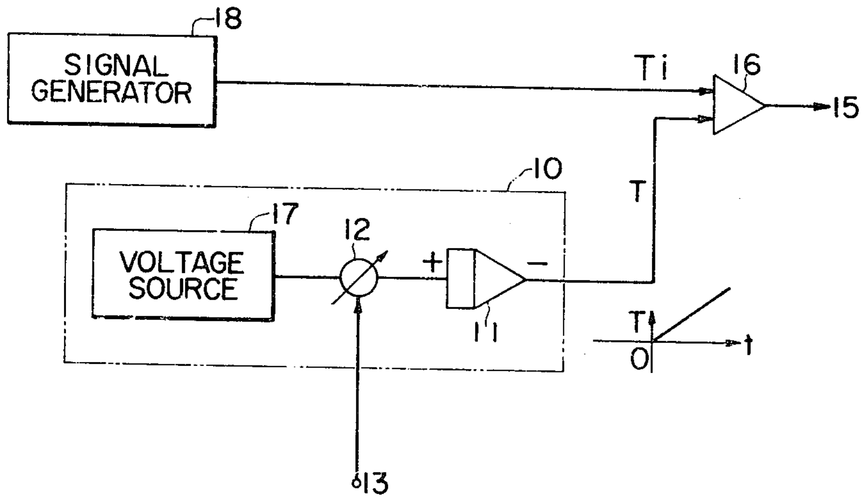

As another example of the simulation language, there is the following representation:

$$R = FIN\ (T, T_i) \tag{2}$$

where T is the time measured in seconds. When the statement of the simulation language is executed, if the computation time T exceeds $T_i$, for example ten seconds, R = "1" Then, the present computation is stopped and transferred to the next computation. FIG. 3 shows the circuit part of the automatic control system 14 for performing this function. A known ramp function generator 10 which converts a time signal _t_ into a ramp voltage comprises a potentiometer 12 and an integrator 11. To the potentiometer 12 is connected a voltage source 17 the output of which is controlled by an instruction signal from the digital computer 13 so that the slope of the ramp function T is determined. A comparator 16 is supplied with a signal $T_i$ from a reference time signal generator 18 comprising a variable voltage source and the ramp function T. When the condition of Equation (2) is satisfied, an output signal of the comparator 16 is supplied to the analog computer 15 to put all the integrators in a hold state.

We claim:

1. A hybrid computing apparatus of the automatic connection type comprising a digital computer for producing an instruction signal, an analog computer having a plurality of analog computing elements including integrators, and an automatic control system for controlling the mode of operation of selected ones of said integrators of said analog computer in accordance with the instruction signal from said digital computer, said automatic control system including comparators for decision on the end result of the computation of said integrators, means for supplying an output of said comparators to said digital computer, means for generating a mode of operation control signal for said integrators and a switch for supplying the mode of operation control signal to said integrators in accordance with outputs of said comparators.

2. A hybrid computing apparatus of the automatic connection type comprising a digital computer for producing an instruction signal, an analog computer having a plurality of analog computing elements including integrators, and an automatic control system for controlling the mode of operation of selected ones of said integrators of said analog computer in accordance with the instruction signal from said digital computer, said automatic control system including means for storing the instruction signals from said digital computer, a logical gate matrix arrangement including a plurality of AND circuits arranged in a matrix form, function switches, each of said AND circuits being supplied with signals from said function switches and said storing means, and means for supplying outputs of said AND circuits to the integrators.

3. A hybrid computing apparatus of the automatic connection type comprising a digital computer for producing an instruction signal, an analog computer having a plurality of analog computing elements including integrators, and an automatic control system for controlling the mode of operation of selected ones of said integrators of said analog computer in accordance with the instruction signal from said digital computer, said automatic control system including a comparator for decision on computation time, a reference time setter for generating a reference time setting signal, a ramp signal generator for generating a ramp signal, means for applying the reference time setting signal and the ramp signal to the comparator, means for controlling the slope of the ramp signal by the instruction signal from said digital computer, and means for feeding an output signal from said comparator to said integrators.

4. A hybrid computing apparatus of the automatic connection type comprising a digital computer for decoding a program written in a simulation language and producing an instruction signal, an analog computer having a plurality of first analog computing elements including integrators, and an automatic control system including second analog computing elements different from the first analog computing elements of said analog computer, said second analog computing elements of said automatic control system each corresponding to a respective one describing forms of the simulation language for controlling the mode of the operation of selected ones of said integrators of said analog computer in accordance with the instruction signal from said digital computer.

* * * * *